United States Patent
Lin et al.

(10) Patent No.: US 12,550,205 B2
(45) Date of Patent: Feb. 10, 2026

(54) METHOD FOR ADDING NON-3GPP LEG TO AN MA PDU SESSION WITH 3GPP PDN LEG

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 366 days.

(21) Appl. No.: 18/088,359

(22) Filed: Dec. 23, 2022

(65) Prior Publication Data

US 2023/0217509 A1 Jul. 6, 2023

Related U.S. Application Data

(60) Provisional application No. 63/296,020, filed on Jan. 3, 2022.

(51) Int. Cl.
- *H04W 76/10* (2018.01)
- *H04W 60/04* (2009.01)
- *H04W 76/30* (2018.01)

(52) U.S. Cl.
CPC ........... *H04W 76/10* (2018.02); *H04W 60/04* (2013.01); *H04W 76/30* (2018.02)

(58) Field of Classification Search
CPC ..... H04W 76/10; H04W 60/04; H04W 76/30; H04W 76/16; H04W 76/12; H04W 76/32; H04W 76/34
USPC .......................................................... 370/329
See application file for complete search history.

(56) References Cited

U.S. PATENT DOCUMENTS

| | | | |
|---|---|---|---|
| 11,606,730 B2 * | 3/2023 | Jeong | H04W 36/00226 |
| 12,375,888 B2 * | 7/2025 | Kim | H04W 4/08 |
| 2020/0404552 A1 * | 12/2020 | Huang-Fu | H04W 36/0027 |

(Continued)

OTHER PUBLICATIONS

3GPP TR 23.793 V16.0.0—"Study on access traffic steering, switch and splitting support in the 5G system architecture" (Dec. 2018), 2018.*

(Continued)

*Primary Examiner* — Jae Y Lee
*Assistant Examiner* — Haeshil Jessica Choi
(74) *Attorney, Agent, or Firm* — Helen Mao; Zheng Jin; Imperium Patent Works

(57) ABSTRACT

A method of handling multi-access (MA) Protocol data unit (PDU) session establishment procedure for an MA PDU session already established with a 3GPP PDN leg is proposed. In one novel aspect, for a 5GS MA PDU session already established on 3GPP access via an EPS PDN connection, upon receipt of a PDU SESSION ESTABLISHMENT ACCEPT message over non-3GPP access, the UE performs a local release of the MA PDU session if any value of at least one of the critical MA PDU session parameters, including the PDU session type, selected SSC mode, 5GSM cause, PDU address, S-NSSAI, and DNN IEs in the PDU SESSION ESTABLISHMENT ACCEPT message is different-from/un-sync/not-matched/not-compatible-with the corresponding stored value of the MA PDU session mapped from the (default EPS bearer of the) PDN connection. The UE also performs a REGISTRATION procedure over non-3GPP access and a TAU procedure over 3GPP access.

20 Claims, 4 Drawing Sheets

(56) References Cited

U.S. PATENT DOCUMENTS

| | | | | |
|---|---|---|---|---|
| 2023/0199605 A1* | 6/2023 | Watfa | ................... | H04W 36/32 |
| | | | | 370/331 |
| 2023/0224767 A1* | 7/2023 | Watfa | ................ | H04W 28/0268 |
| | | | | 370/331 |

OTHER PUBLICATIONS

Europe IPO, search report for the European patent application 23150020.8, dated Jun. 1, 2023 (10 pages).

C1-220174, MediaTek Inc., "Abnormal handling for adding non-3GPP leg to an MA PDU session already with PDN leg", 3GPP TSG-CT WG1 Meeting #133e-bis, dated Jan. 17-21, 2022 (5 pages).

\* cited by examiner

METHOD FOR ADDING NON-3GPP LEG TO AN MA PDU SESSION WITH 3GPP PDN LEG

CROSS REFERENCE TO RELATED APPLICATIONS

This application claims priority under 35 U.S.C. § 119 from U.S. Provisional Application No. 63/296,020, entitled "ATSSS adding non-3GPP leg to an MA PDU session already with PDN leg", filed on Jan. 3, 2022, the subject matter of which is incorporated herein by reference.

TECHNICAL FIELD

The disclosed embodiments relate generally to wireless communication, and, more particularly, to method of Multi-Access (MA) PDU session establishment handling for addling a non-3GPP leg to an MA PDU session established with a PDN leg.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems (5GS).

In 5G, a Protocol Data Unit (PDU) session defines the association between the UE and the data network that provides a PDU connectivity service. The PDU session establishment is a parallel procedure of PDN connection (bearer) procedure in 4G/LTE. Each PDU session identified by a PDU session ID (PSI), and may include multiple QoS flows and QoS rules. Each PDU session can be established via a 5G Access Network (e.g., a 3GPP radio access network (RAN), or a non-3GPP RAN). The network/UE can initiate different PDU session procedures, e.g., PDU session establishment, PDU session modification, and PDU session release. 4G EPS (EUTRAN connected to EPC) can be regarded as "3GPP access" of EPC.

Operators are seeking ways to balance data traffic between mobile cellular networks and non-3GPP access in a way that is transparent to users and reduces mobile network congestion. In 5GS, UEs that can be simultaneously connected to both 3GPP access (3GPP access of 5GS, or 3GPP access of EPC) and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network.

In addition, ATSSS (Access Traffic Steering, Switching, Splitting) is an optional feature that can be supported by the UE and the 5GC network to route data traffic across 3GPP access and non-3GPP access networks for the established MA PDU session. An ATSSS-capable UE establishes an MA PDU session supporting multi-access connectivity over 3GPP access and non-3GPP access networks. At any given time, the MA PDU session can have user-plane resources established on both 3GPP access (also referred as 3GPP leg, e.g., 3GPP 5GS leg or 3GPP EPS/PDN leg) and non-3GPP access (also referred as non-3GPP leg), or on one access only (either 3GPP access or non-3GPP access).

In certain networks, LTE has more coverage than NR, and sometimes UE are not able to establish 3GPP 5GS leg for an MA PDU session when NR coverage is unavailable. Therefore, it is beneficial that a 4G EPS PDN connection can be established as the user-plane resource for a corresponding MA PDU session over 3GPP access (also referred as 3GPP PDN leg). However, it becomes a challenge for a UE to determine whether the parameters of the adding non-3GPP leg are compatible with the stored (mapped) parameters of an existing MA PDU session that already has a 3GPP PDN leg, and how the UE handles when the UE determines the parameters are not compatible.

A solution is sought.

SUMMARY

A method of handling multi-access (MA) Protocol data unit (PDU) session establishment procedure for an MA PDU session already established with a 3GPP PDN leg is proposed. In one novel aspect, for a 5GS MA PDU session already established on 3GPP access via an EPS PDN connection, upon receipt of a PDU SESSION ESTABLISHMENT ACCEPT message over non-3GPP access, the UE performs a local release of the MA PDU session if any value of at least one of the critical MA PDU session parameters, including the PDU session type, selected SSC mode, 5GSM cause, PDU address, S-NSSAI, and DNN IEs in the PDU SESSION ESTABLISHMENT ACCEPT message is different from the corresponding stored value of the MA PDU session mapped from the PDN connection. The UE also performs a registration procedure for mobility and periodic registration update with a REGISTRATION REQUEST message including a PDU session status IE sent over non-3GPP access and performs a tracking area updating procedure with a TRACKING AREA UPDATE REQUEST message including EPS bearer context IE sent over EPS (i.e., EPC 3GPP access).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
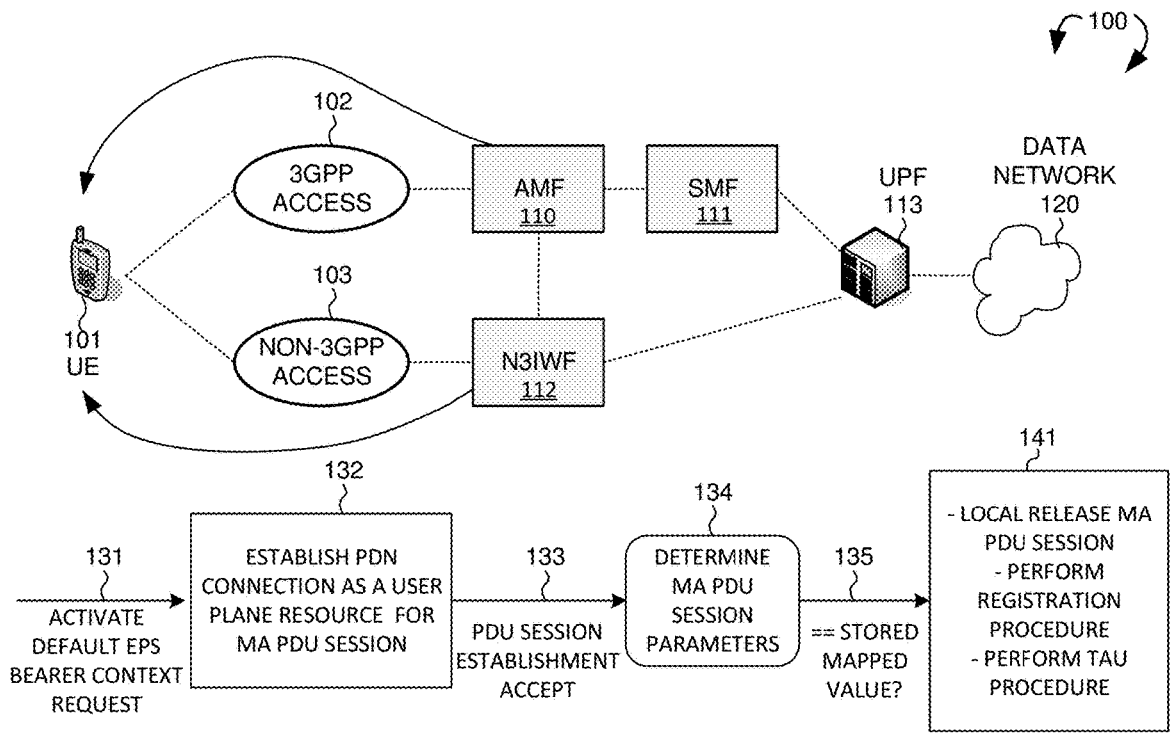
FIG. 1 illustrates an exemplary 5G network supporting adding non-3GPP leg to a Multi-Access Protocol Data Unit (MA PDU) session with 3GPP PDN leg in accordance with one novel aspect.

FIG. 1 illustrates an exemplary 5G network 100 supporting adding non-3GPP leg to a Multi-Access Protocol Data Unit (MA PDU) session with 3GPP PDN leg in accordance with one novel aspect. 5G network 100 comprises a user equipment UE 101, a 3GPP radio (e.g., NR or EUTRAN) access network RAN 102, a non-3GPP radio access network RAN 103, an Access and Mobility Management Function (AMF) 110, a Session Management Function (SMF) 111, a Non-3GPP Interworking Function (N3IWF) 112, a User-plane Function (UPF) 113, and a data network 120. The AMF communicates with the base station, SMF and UPF for access and mobility management of wireless access devices in mobile communication network 100. The SMF is primarily responsible for interacting with the decoupled data plane, creating, updating, and removing Protocol Data Unit (PDU) sessions and managing session context with the UPF. The N3IWF functionality interfaces to 5G core network control plane functions, responsible for routing messages outside 5G RAN.

In Access Stratum (AS) layer, RAN provides radio access for UE 101 via a radio access technology (RAT). In Non-Access Stratum (NAS) layer, AMF and SMF communicate with RAN and 5GC for access and mobility management and PDU session management of wireless access devices in 5G network 100. 3GPP Radio access network RAN 102 may include base stations (e.g., gNBs or eNBs) providing radio access for UE 101 via various 3GPP RATs including 5G, 4G, and 3G/2G. Non-3GPP radio access network RAN 103 may include access points (APs) providing radio access for UE 101 via non-3GPP including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

EPS networks are packet-switched (PS) Internet Protocol (IP) networks. This means that the networks deliver all data traffic in IP packets, and provide users with Always-On IP Connectivity. When UE joins an EPS network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service. Each PDU session is identified by a PDU session ID (PSI), and may include multiple QoS flows and QoS rules.

Each PDU session can be established over a 3GPP RAN, or over a non-3GPP RAN for radio access. 5G Session management (5GSM) for PDU sessions over both 3GPP access and non-3GPP access are managed by AMF and SMF via NAS signaling. Operators are seeking ways to balance data traffic between mobile networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network.

In addition, the UE and the network can support Access Traffic Steering Switching and Splitting (ATSSS) functionalities to distribute traffic over 3GPP access and non-3GPP access for the established MA PDU session. An ATSSS capable UE establishes an MA PDU session supporting multi-access connectivity over 3GPP access and non-3GPP access networks. At any given time, the MA PDU session can have user-plane resources established on both 3GPP access (referred as 3GPP 5GS leg or 3GPP EPS/PDN leg) and non-3GPP access (referred as non-3GPP leg), or on one access only (either 3GPP access or non-3GPP 5GS access). In certain networks, LTE has more coverage than NR, and sometimes UE are not able to establish 3GPP 5GS leg for an MA PDU session when NR coverage is unavailable. Therefore, it is beneficial that a 4G EPS PDN connection can be established as the user-plane resource for a corresponding MA PDU session over 3GPP access (referred as 3GPP PDN leg).

For MA PDU session establishment procedure, it becomes a challenge on adding a non-3GPP leg to an existing MA PDU session that already has a 3GPP PDN leg. In accordance with one novel aspect, a method of handling MA PDU session establishment procedure with a PDU SESSION ESTABLISHMENT ACCEPT message for adding a non-3GPP leg to an MA PDU session with a 3GPP PDN leg is proposed. UE 101 is registered to 4G EPS/EPC for 3GPP access as well as registered to 5GC via WiFi for non-3GPP access. UE 101 first receives an ACTIVATE DEFAULT EPS BEARER CONTEXT REQUEST message over 3GPP access type for an MA PDU session (step 131). A PDN connection is established as a user-plane resource over 3GPP (3GPP PDN leg) for the MA PDU session (step 132). UE 101 then receives a PDU SESSION ESTABLISHMENT ACCEPT message over non-3GPP access type for adding a non-3GPP leg to the same MA PDU session (step 133).

In step 134, UE 101 determines MA PDU session parameters carried by the PDU SESSION ESTABLISHMENT ACCEPT message. UE 101 checks if any of the critical parameters in the PDU SESSION ESTABLISHMENT ACCEPT message is different from the corresponding stored parameters value of the MA PDU session mapped from the PDN connection (step 135). In step 141, for the MA PDU session already has a 3GPP PDN leg, upon receipt of the PDU SESSION ESTABLISHMENT ACCEPT message over non-3GPP, UE 101 performs a local release of the MA PDU session if the answer to step 135 is yes (i.e., any of the critical parameters in the PDU SESSION ESTABLISHMENT ACCEPT message is different from the corresponding stored parameters value of the MA PDU session). UE 101 also performs a registration procedure for mobility and periodic registration update with a REGISTRATION REQUEST message including a PDU session status IE sent over non-3GPP access and performs a tracking area updating procedure with a TRACKING AREA UPDATE REQUEST message including EPS bearer context IE sent over 3GPP access.

Figure 2:
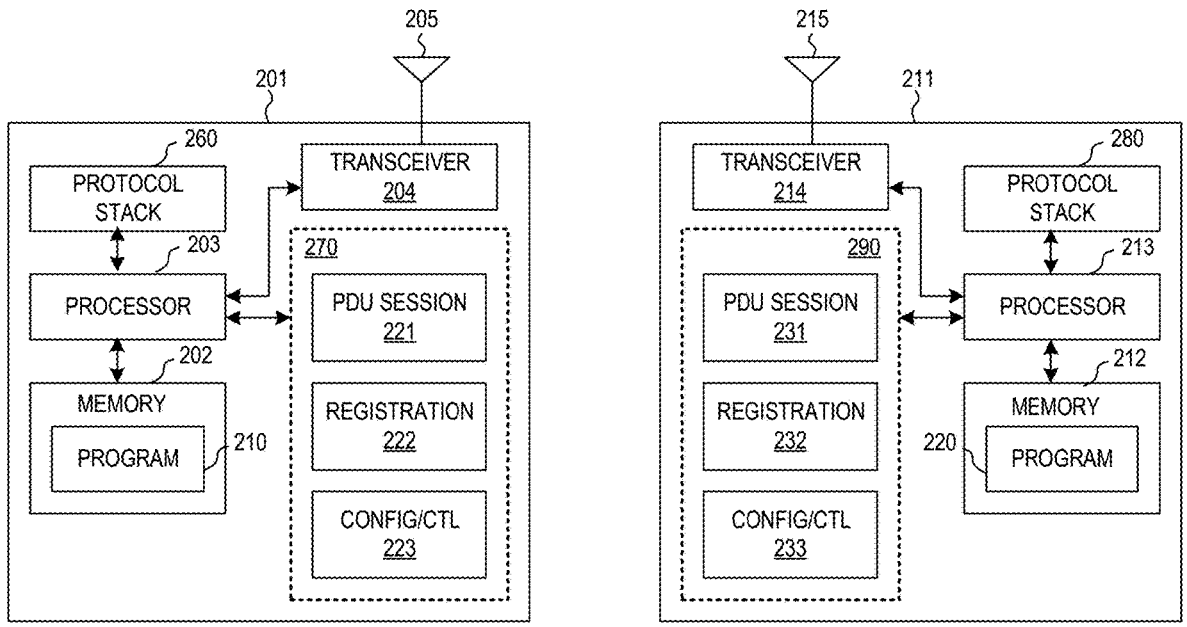
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuitry 290.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuitry to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuitry 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one embodiment, system modules and circuits 270 comprise PDU session handling circuit 221 that performs PDU session establishment and modification procedures with the network, a registration handling circuit 222 that performs registration with the network via 3GPP or non-3GPP access, and a configuration and control circuit 223 that handles configuration and control parameters for mobility management and session management. In one example, UE 201 initiates adding a non-3GPP leg to an existing MA PDU session that already has a 3GPP PDN leg. UE 201 performs a local release of the MA PDU session if any of the critical parameters in the PDU SESSION ESTABLISHMENT ACCEPT message is different from the corresponding stored mapped value of the MA PDU session. UE 201 also performs a registration procedure for mobility and periodic registration update with a REGISTRATION REQUEST message including a PDU session status IE that is sent over non-3GPP access and performs a tracking area updating procedure with a TRACKING AREA UPDATE REQUEST message including EPS bearer context IE that is sent over 3GPP access.

Figure 3:
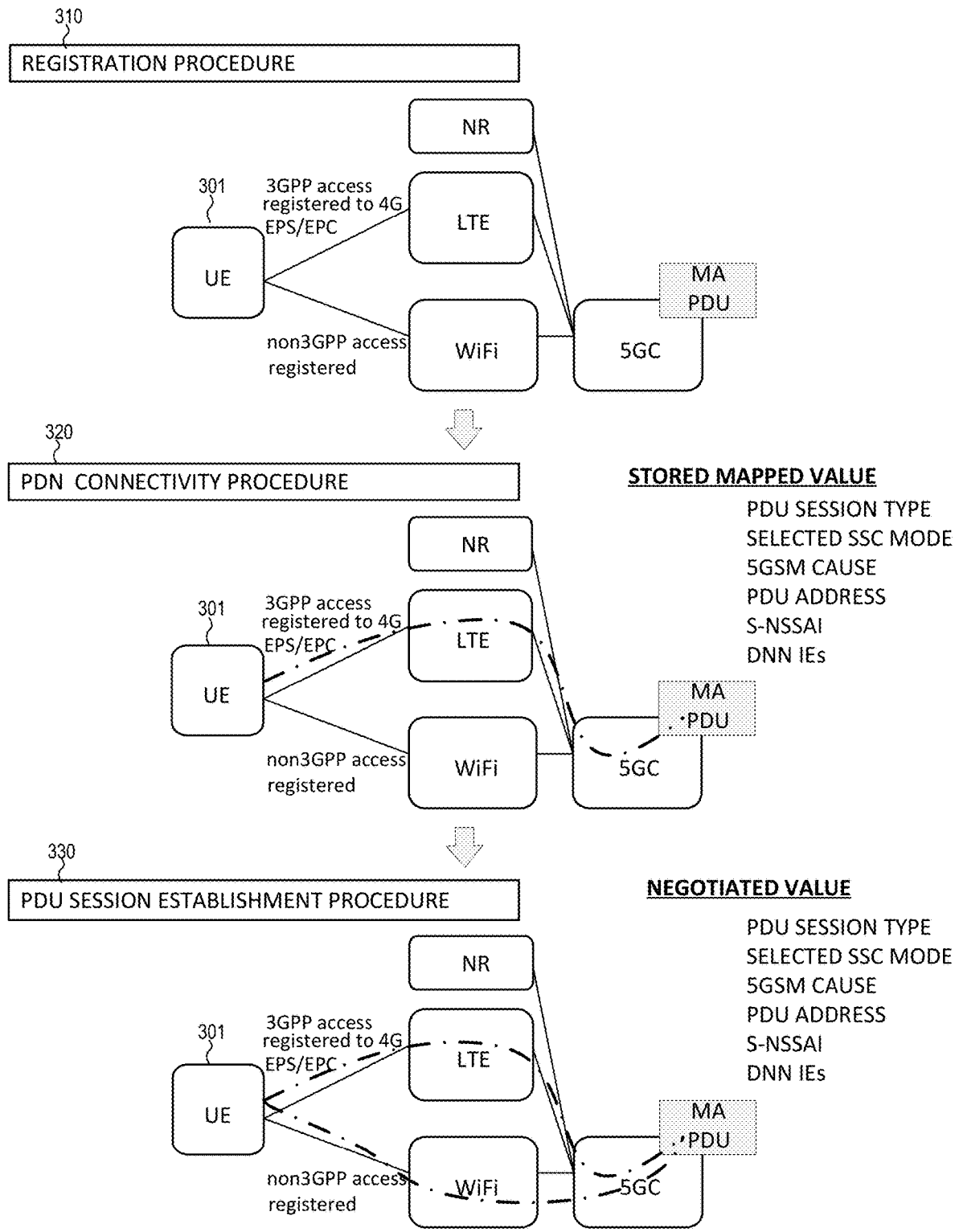
FIG. 3 illustrates the different procedures for registration to 5GS over 3GPP and non-3GPP accesses, establishing an MA PDU session with a 3GPP PDN leg, and adding a non-3GPP leg to the MA PDU session.

FIG. 3 illustrates the different procedures for registration to 5GS over 3GPP and non-3GPP accesses, establishing an MA PDU session with a 3GPP PDN leg, and adding a non-3GPP leg to the MA PDU session. An MA PDU session in 5GS can be established after a UE is registered to the network over both 3GPP access type and non-3GPP access type. The UE can establish a MA PDU session by initiating a PDU session establishment procedure with the network over either 3GPP or non-3GPP access type and activating the MA PDU session. The activation of the MA PDU connectivity service refers to the establishment of user-plane resources on both 3GPP access and non-3GPP access. UE can also establish a MA PDU session by initiating a PDN connectivity procedure, where the PDN connection can be established as the user-plane resource for the MA PDU session.

In the embodiment of FIG. 3, UE 301 first performs registration procedure (310). UE 301 is registered to 4G EPS/EPC (LTE) for 3GPP access, and is registered to 5GC via WiFi for non-3GPP access. Note that UE 301 may not be registered to 5GC via NR for 3GPP access. Next, UE 301 performs PDN connectivity procedure for the purpose of establishing an MA PDU session (320). UE 301 establishes a PDN connection as a user-plane resource of the MA PDU session to be established. Afterward, UE 301 considers that the MA PDU session is established based on parameters from the default EPS bearer context of the PDN connection provided by the network. UE 301 stores corresponding MA PDU session parameters mapped from the default EPS bearer context of the PDN connection: mapped PDU session type, selected SSC mode (set to SSC mode 1), mapped 5GSM cause, mapped PDU address, S-NSSAI (provided by the network), and mapped DNN IEs.

Next, UE 301 performs a PDU session establishment procedure for the purpose of adding a non-3GPP leg to the existing MA PDU (330). UE 301 initiates a UE-requested PDU session establishment procedure to establish user-plane resources over non-3GPP access for the MA PDU session. UE 301 should set the request type of "MA PDU request" in the UL NAS TRANSPORT message; set the PDU session ID to the stored PDU session ID corresponding to the established MA PDU session in the PDU SESSION ESTABLISHMENT REQUEST message and in the UL NAS TRANSPORT message; and set the S-NSSAI in the UL NAS TRANSPORT message to the stored S-NSSAI associated with the PDU session ID. UE 301 receives a PDU SESSION ESTABLISHMENT ACCEPT message from the network. However, if any of the critical parameters in the PDU SESSION ESTABLISHMENT ACCEPT message (the negotiated value) is different from the stored mapped value of the MA PDU session, then UE 301 should locally release the entire MA PDU session and performs registration procedure over non-3GPP and TAU procedure over 3GPP. The critical MA PDU parameters include at least one of a PDU session type, selected SSC mode (set to SSC mode 1), 5GSM cause, PDU address, S-NSSAI, and DNN IEs.

Figure 4:
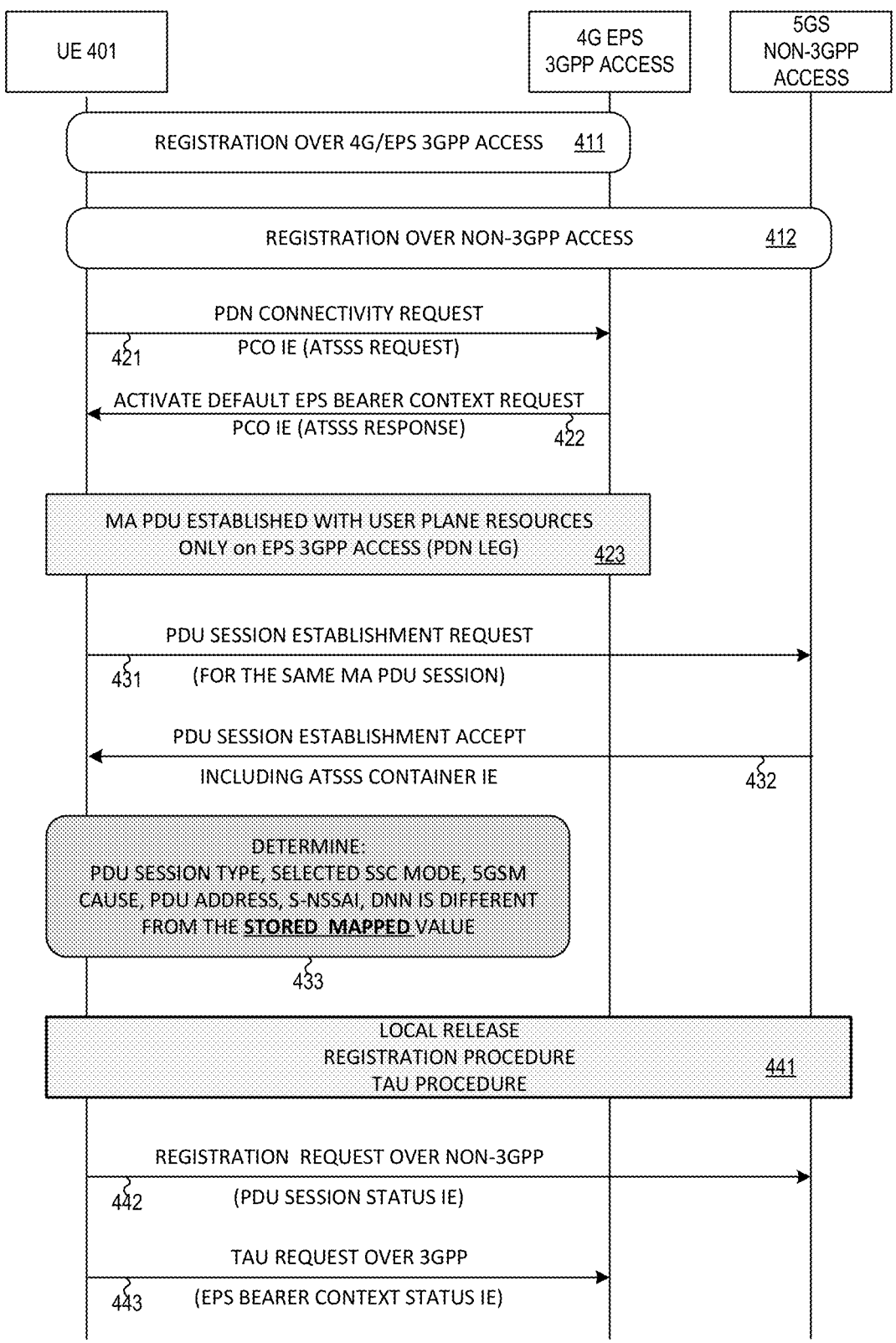
FIG. 4 illustrates a sequence flow between a UE and a 5GS network for establishing an MA PDU over both EPS 3GPP access and 5GS non-3GPP access, and abnormal error handling in one novel aspect.

FIG. 4 illustrates a sequence flow between a UE and a 5GS network for establishing an MA PDU over both EPS 3GPP access and 5GS non-3GPP access, and abnormal error handling in one novel aspect. In step 411, UE 401 performs registration with the 4G EPS network over 3GPP access. In step 412, UE 401 performs registration with the 5GS network over non-3GPP access. In step 421, UE 401 sends a PDN CONNECTIVITY REQUEST message to 4G EPS to establish a PDN connection as a user-plane resource for an MA PDU session. The UE sets the request type to "initial request", sets the PDN Type IE to "IPv4", "IPv6", "IPv4v6" or "Ethernet". In the protocol configuration options (PCO) or extended PCO IE of the PDN CONNECTIVITY REQUEST message, the UE includes the ATSSS request PCO parameter. In step 422, UE 401 receives an ACTIVATE DEFAULT EPS BEARER CONTEXT REQUEST message of a default EPS bearer context activation procedure as a response to the PDN CONNECTIVITY REQUEST message (and the UE sends ACTIVATE DEFAULT EPS BEARER CONTEXT ACCEPT message to the network). The ACTIVATE DEFAULT EPS BEARER CONTEXT REQUEST message contains the extended PCO IE with the ATSSS response having the length of two octets PCO parameter.

In step 423, UE 401 considers that the MA PDU session is established, and stores MA PDU session parameters mapped from the default EPS bearer context of the PDN connection as follows: 1) the PDN type of the default EPS bearer context shall be mapped to the PDU session type of the MA PDU session as follows: i) if the PDN type is "IPv4", the PDU session type is set to "IPv4"; ii) if the PDN type is "IPv6", the PDU session type is set to "IPv6"; iii) if the PDN type is "IPv4v6", the PDU session type is set to "IPv4v6"; or iv) if the PDN type is "Ethernet", the PDU session type is set to "Ethernet"; 2) the PDN address of the default EPS bearer context shall be mapped to PDU address of the MA PDU session; 3) the APN of the default EPS bearer context shall be mapped to the DNN of the MA PDU session; 4) the PDU session identity of the MA PDU session shall be set to the PDU session identity included by the UE in the Protocol configuration options IE or Extended protocol configuration options IE in the PDN CONNECTIVITY REQUEST message; 5) the S-NSSAI of the MA PDU session shall be set to the S-NSSAI included by the network in the Protocol configuration options IE or Extended protocol configuration options IE in the ACTIVATE DEFAULT EPS BEARER REQUEST message, if the PDN connection is a non-emergency PDN connection; 6) the SSC mode of the MA PDU session shall be set to "SSC mode 1"; 7) state of the PDU session shall be set to PDU SESSION ACTIVE; 8) the ESM cause of the default EPS bearer context, if any, shall be mapped to the 5GSM cause of the MA PDU session as follows: i) if the ESM cause is #50 "PDN type IPv4 only allowed", the 5GSM cause of the MA PDU session is set to #50 "PDU session type IPv4 only allowed"; or ii) if the ESM cause is #51 "PDN type IPv6 only allowed", the 5GSM cause of the MA PDU session is set to #51 "PDU session type IPv6 only allowed".

Once the MA PDU session is established with a 3GPP PDN leg, UE 401 then wants to add a non-3GPP leg to the same MA PDU session. In step 431, UE 401 sends a PDU SESSION ESTABLISHMENT REQUEST message to 5GS over non-3GPP access, indicating the same PDU session ID and a Request type=MA PDU for the same MA PDU session. In step 432, UE 401 receives a PDU SESSION ESTABLISHMENT ACCEPT message over non-3GPP access from 5GS for the same MA PDU session. The accept message includes ATSSS container IE, and includes a set of critical MA PDU session parameters, e.g., PDU session type, selected SSC mode, 5GSM cause, PDU address, S-NSSAI, and DNN IEs.

In step 433, UE 401 determines whether at least one of the following critical parameters carried by the ACCEPT message is different from the stored mapped value of the MA PDU session: PDU session type, selected SSC mode (set to SSC mode 1), 5GSM cause, PDU address, S-NSSAI, and DNN IE. If the answer is yes, then the MA PDU session may not function properly. For example, the same MA PDU session cannot have different PDU addresses. Thus, in step 441, UE 401 locally releases the MA PDU session on both access types, e.g., user-plane resources at the UE side are released on both access types. In addition, in step 442, UE 401 performs a registration procedure for mobility and periodic registration update by sending a REGISTRATION REQUEST message including PDU session status IE to the network over non-3GPP access. In step 443, UE 401 performs a tracking area update procedure with a TRACKING AREA UPDATE REQUEST message including EPS bearer context status IE. Specifically, the two status IEs are sent to network over both accesses to indicate to the network that the entire MA PDU session on both accesses is released at the UE side. Note that two IEs need to be sent over 3GPP and non-3GPP accesses independently, in order to synchronize the MA PDU session 2 legs' status with the network. In addition, the two status IEs can be sent sequentially in any order, or be sent simultaneously.

Figure 5:
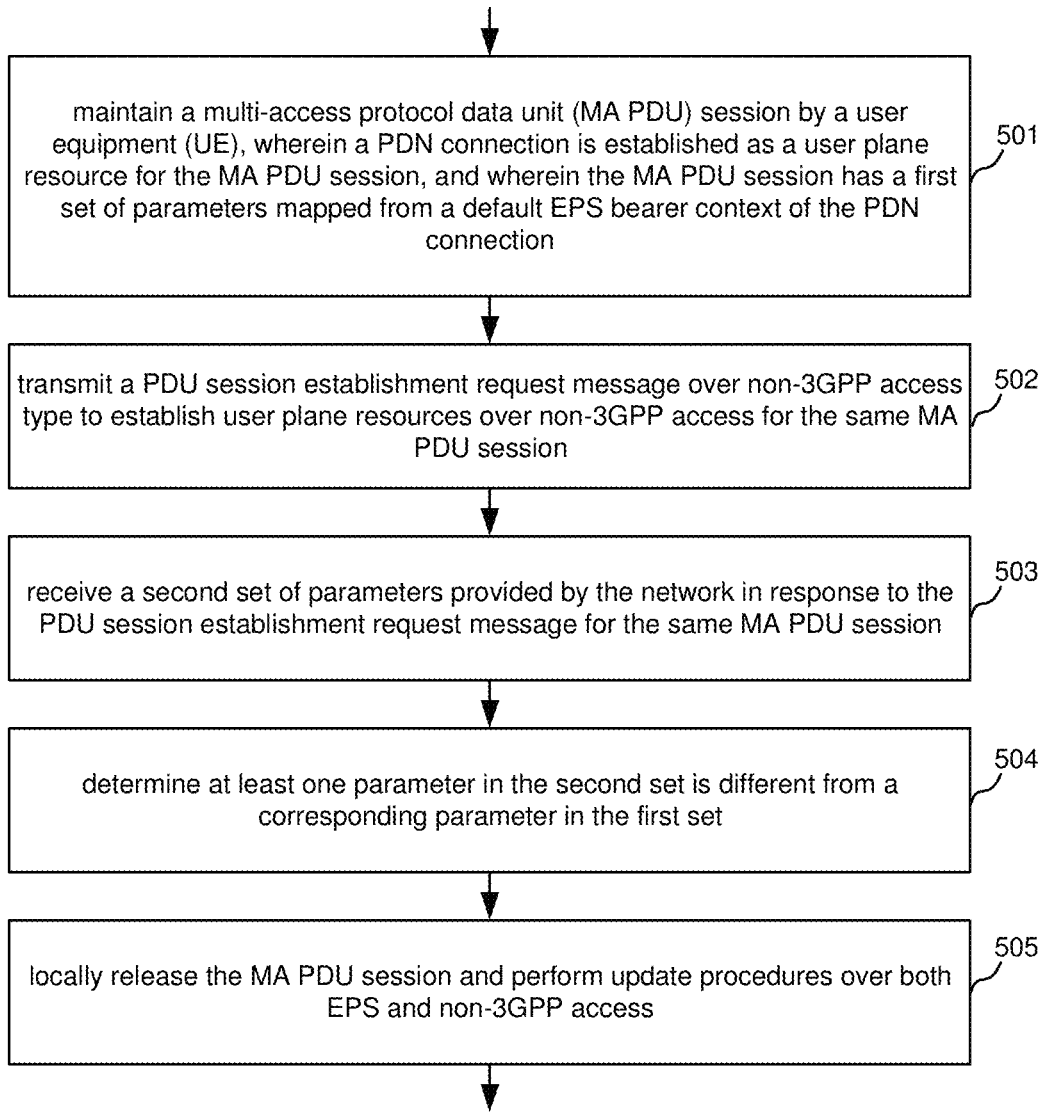
FIG. 5 is a flow chart of a method of adding a non-3GPP leg to a multi-access (MA) Protocol data unit (PDU) session having a 3GPP PDN leg and corresponding error handling in accordance with one novel aspect.

FIG. 5 is a flow chart of a method of adding a non-3GPP leg to a multi-access (MA) Protocol data unit (PDU) session having a 3GPP PDN leg and corresponding error handling in accordance with one novel aspect. In step 501, a UE maintains a multi-access protocol data unit (MA PDU) session. A PDN connection is established as a user-plane resource for the MA PDU session, and the MA PDU session has a first set of parameters mapped from a default EPS bearer context of the PDN connection. In step 502, the UE transmits a PDU session establishment request message over non-3GPP access to establish user-plane resources over non-3GPP access for the same MA PDU session. In step 503, the UE receives a second set of parameters provided by the network in response to the PDU session establishment request message for the same MA PDU session. In step 504, the UE determines at least one parameter in the second set is different from a corresponding parameter in the first set. In step 505, upon the determination, the UE locally releases the MA PDU session and performs update procedures for both 3GPP access and non-3GPP access. The first and the second set of parameters each comprises at least one of a PDU session type, a selected session and service continuity (SSC) mode, a 5G session management (5GSM) cause, a PDU address, a Single Network Slice Selection Assistance Information (S-NSSAI), and a data network name (DNN) information element (IE).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
maintaining a multi-access protocol data unit (MA PDU) session by a user equipment (UE), wherein a PDN connection is established as a user-plane resource for the MA PDU session, and wherein the MA PDU session has a first set of parameters mapped from a default EPS bearer context of the PDN connection;
transmitting a PDU session establishment request message over non-3GPP access to establish user-plane resources on non-3GPP access for the same MA PDU session;
receiving a second set of parameters provided by the network in response to the PDU session establishment request message for the same MA PDU session;
determining at least one parameter in the second set is different from a corresponding parameter in the first set; and
locally releasing the MA PDU session and performing update procedures over both EPS and non-3GPP access.

2. The method of claim 1, wherein the UE performs the registration procedure for mobility and periodic registration update and transmits a REGISTRATION REQUEST messages over non-3GPP access to the network, wherein the REGISTRATION REQUEST message includes a PDU session status information element (IE).

3. The method of claim 2, wherein the PDU session status IE sent over non-3GPP access indicates that the non-3GPP access user-plane resources of the MA PDU session are released.

4. The method of claim 1, wherein the UE performs the tracking area update procedure and transmits a TRACKING AREA UPDATE REQUEST message to the network, wherein the TRACKING AREA UPDATE REQUEST message includes an EPS bearer context status information element (IE).

5. The method of claim 4, the EPS bearer context status IE sent over EPS indicates that the one or more EPS bearers of the PDN connection established as the user-plane resource for 3GPP access of the MA PDU session is released.

6. The method of claim 1, wherein the first and the second set of parameters each comprises at least one of a PDU session type, a selected session and service continuity (SSC) mode, a 5G session management (5GSM) cause, a PDU address, a Single Network Slice Selection Assistance Information (S-NSSAI), and a data network name (DNN) information element (IE).

7. The method of claim 6, wherein the first set of parameters is mapped from parameters included in an activate default EPS bearer context request message received by the UE during a UE requested PDN connectivity procedure for establishing the user-plane resource of the MA PDU session.

8. The method of claim 6, wherein the activate default EPS bearer context request message is in response to a PDN connectivity request or an ESM information response message sent by the UE.

9. The method of claim 6, wherein the UE stores the mapped first set of parameters for the MA PDU session.

10. The method of claim 6, wherein the second set of parameters is included in a PDU session establishment accept message received by the UE over non-3GPP access for the same MA PDU session.

11. A User Equipment (UE), comprising:
a connection handling circuit that maintains a multi-access protocol data unit (MA PDU) session, wherein a PDN connection is established as a user-plane resource for the MA PDU session, and wherein the MA PDU session has a first set of parameters mapped from a default EPS bearer context of the PDN connection;
a transmitter that transmits a PDU session establishment request message over non-3GPP access to establish user-plane resources on non-3GPP access for the same MA PDU session;
a receiver that receives a second set of parameters provided by the network in response to the PDU session establishment request message for the same MA PDU session; and
a control circuit that determines at least one parameter in the second set is different from a corresponding parameter in the first set, and in response, locally releases the MA PDU session and performs update procedures over both EPS and non-3GPP access.

12. The UE of claim 11, wherein the UE performs the registration procedure for mobility and periodic registration update and transmits a REGISTRATION REQUEST messages over non-3GPP access to the network, wherein the REGISTRATION REQUEST message includes a PDU session status information element (IE).

13. The UE of claim 12, wherein the PDU session status IE sent over non-3GPP access indicates that the non-3GPP access user-plane resources of the MA PDU session are released.

14. The UE of claim 11, wherein the UE performs the tracking area update procedure and transmits a TRACKING AREA UPDATE REQUEST message to the network, wherein the TRACKING AREA UPDATE REQUEST message includes an EPS bearer context status information element (IE).

15. The UE of claim 14, the EPS bearer context status IE sent over EPS indicates that the one or more EPS bearers of the PDN connection established as the user-plane resource for 3GPP access of the MA PDU session is released.

16. The UE of claim 11, wherein the first and the second set of parameters each comprises at least one of a PDU session type, a selected session and service continuity (SSC) mode, a 5G session management (5GSM) cause, a PDU address, a Single Network Slice Selection Assistance Information (S-NSSAI), and a data network name (DNN) information element (IE).

17. The UE of claim 16, wherein the first set of parameters is mapped from parameters included in an activate default EPS bearer context request message received by the UE during a UE requested PDN connectivity procedure for establishing the user-plane resource of the MA PDU session.

18. The UE of claim 16, wherein the activate default EPS bearer context request message is in response to a PDN connectivity request or an ESM information response message sent by the UE.

19. The UE of claim 16, wherein the UE stores the mapped first set of parameters for the MA PDU session.

20. The UE of claim 16, wherein the second set of parameters is included in a PDU session establishment accept message received by the UE over non-3GPP access for the same MA PDU session.

* * * * *